United States Patent

[11] 3,589,175

[72] Inventors Harold Bock
Los Angeles;
Harold Ernest Elsner, Culver City, both of, Calif.
[21] Appl. No. 777,351
[22] Filed Nov. 20, 1968
[45] Patented June 29, 1971
[73] Assignee VSI Corporation
Pasadena, Calif.

[54] DYNAMIC FATIGUE TESTING
17 Claims, 4 Drawing Figs.
[52] U.S. Cl................................................... 73/91,
73/103, 73/141
[51] Int. Cl......................................................... G01n 3/32
[50] Field of Search............................................ 73/91, 141
A, 92, 93; 100/99

[56] References Cited
UNITED STATES PATENTS
3,187,565  6/1965  Kreiskorte et al. ............ 73/91 X

*Primary Examiner*—Jerry W. Myracle
*Attorney*—Christie, Parker and Hale

ABSTRACT: The longitudinal strain and the deflection of a test specimen are monitored and recorded while the load is being applied in a dynamic fatigue test. Strain gauges mounted on a gauge member sense the longitudinal strain and the deflection of the test specimen indirectly. The mounts for the test specimen are designed so specimens can e quickly replaced and adapter sleeves are used so the mounts can accommodate different size test specimens.

PATENTED JUN29 1971

3,589,175

INVENTORS.
HAROLD BOCK
HAROLD ERNEST ELSNER
BY
Christie, Parker & Hale
ATTORNEYS

DYNAMIC FATIGUE TESTING

This invention relates to testing the strength of material specimens and, more particularly, to a method and apparatus for performing dynamic fatigue tests on specimens.

Manufactured items such as fasteners are frequently required to pass a dynamic fatigue test. Machines for performing such dynamic fatigue tests are commercially available. In a dynamic fatigue tester, the test specimen is subjected to a load along its longitudinal axis that varies cyclically between prescribed maximum and minimum values of force. Typically, the machine is calibrated prior to testing each specimen or each group of specimens to establish the prescribed maximum and minimum values of force, but there is no way of knowing the actual force applied.

It has been found that misalignment of the longitudinal axis of a test specimen in the machine weakens the specimen and causes more failures than would occur with proper alignment. Thus, the specimens are actually subjected to a more rigorous test than prescribed, with the result that more lots of the tested items may be rejected than are actually defective.

In accordance with the invention, the longitudinal load applied to a test specimen is monitored during dynamic fatigue tests. Further, the deflection of the specimen is also monitored during test. Consequently, a record of the test is developed from which it can be determined whether the specimen has in fact been subjected to a cyclic force that satisfies the prescribed minimum and maximum values in a longitudinal direction without being subjected to excessive deflection.

Preferably, the specimen is placed in a fatigue testing machine in series with a gauge member to which orthogonally oriented strain gauges are bonded. The gauge member has a greater endurance limit than the specimen. The strain guages sense the longitudinal strain and deflection on the gauge member which are proportional to these quantities on the test specimen. The responses of the strain gauges are registered by a recorder. Specimen mounts are designed for easy removal and replacement of test specimens and adapter sleeves permit different size specimens to be accurately tested. The features of specific embodiments of the invention are illustrated in the drawing, in which:

Figure 1B:
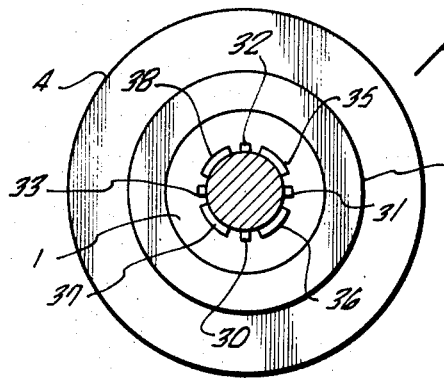
FIG. 1B is a sectional view of the apparatus of FIG. 1A.
Figure 1A:
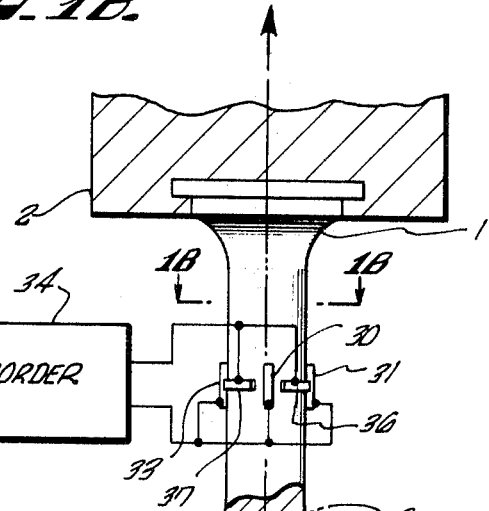
FIG. 1A is a front elevation view partially in section of one embodiment of apparatus incorporating the principles of the invention.

In FIGS. 1A and 1B, a thin, solid, cylindrical gauge member 1 is shown which is attached at one end to a force applying arm 2 of a conventional dynamic fatigue testing machine. The other end of guage member 1 is attached to a hub 3 having male threads formed in its outer surface. A specimen mount 4 has a cavity 5 defined by cylindrical walls with female threads that mate with the threads of hub 3 and a bore 6. A hub 7, which is mounted to a stationary portion 11 of the fatigue testing machine, has male threads formed in its outer surface. A specimen mount 8, which is identical to specimen mount 4, has a cavity 9 and a bore 10. Female threads formed in the walls defining cavity 9 engage the male threads of hub 7 when a test specimen 15 is positioned in the testing machine as illustrated in FIG. 1A. Mounts 4 and 8 are substantially aligned on a common vertical axis 12. Adapter sleeves 16 and 17 have outer diameters that form a tight fit with bores 6 and 10, respectively, and inner diameters that form a tight fit with specimen 15. Thus, sleeves 16 and 17 prevent specimen 15 from moving laterally in mounts 4 and 8. Specimen 15 is shown as a fastener with a head 18 and a nut 19 between which sleeves 16 and 17 are located. Flanges 20 and 21 prevent the passage of sleeves 16 and 17, respectively, through bores 6 and 10, respectively, as longitudinal tensile force is applied to specimen 15.

Arm 2 of the fatigue testing machine holds specimen 15 under tension all the time it is held by mounts 4 and 8. Arm 2 moves up and down along axis 12 as indicated by the arrow in FIG. 1A. Thus, a tensile force is exerted on specimen 15 and on gauge member 1 along their longitudinal axes, which are substantially aligned with axis 12. Since specimen 15 and gauge member 1 are in effect connected in series, the same load is exerted on both of them. The magnitude of the applied tensile force varies cyclically between adjustable maximum and minimum values. Strain gauges 30, 31, 32 and 33 are bonded to the outer surface of guage member 1, precisely oriented in parallel relationship with the axis of guage member 1 at 90° intervals along its perimeter. The outputs of strain guages 30 through 33 are combined and applied to a recorder 34, which could be an oscillograph. Thus, recorder 34 indicates the average longitudinal strain on gauge member 1 as a function of time, which is proportional to the longitudinal load applied to the specimen 15. Strain guages 35, 36, 37, and 38 are bonded to the outer surface of gauge member 1, precisely oriented in orthogonal relationship with strain gauges 30 through 33. Strain gauges 35 through 38 are located at 90° intervals between the respective ones of strain gauges 30 through 33 as illustrated in FIG. 1B. The outputs of strain guages 35 through 38 are combined and applied to recorder 34. Thus, recorder 34 also indicates the average deflection of gauge member 1 as a function of time, which is proportional to the deflection to which specimen 15 is subjected. Recorder 34 registers both strain and deflection on the same storage medium, such as paper, so both may be conveniently observed together.

The deflection of specimen 15 and guage member 1 is brought about by misalignment of the components of the testing apparatus, particularly gauge member 1 and/or specimen 15, which occurs while a test specimen is being set up in the machine or in the course of operation. If gauge member 1 and/or test specimen 15 are misaligned with the direction of the applied load along axis 12, this situation can be detected by observing the deflection registered by recorder 34. If the registered deflection is too large, e.g. 5 percent of the longitudinal load, the specimen is removed and the misalignment is corrected before the fatigue test proceeds.

To remove the test specimen from the machine, mounts 4 and 8 are simply unscrewed from hubs 3 and 7. If a specimen having a different diameter is to be tested, a new set of sleeves is substituted for sleeves 16 and 17 prior to the replacement of mounts 4 and 8 on hubs 3 and 7. Since the strain guages are not bonded to the test specimen, the test specimen can be quickly removed and replaced by others without disturbing the strain guages.

Preferably, gauge member 1 is designed to have a substantially greater endurance limit than the test specimens. Then, the test specimens can be fatigue tested at higher load values than their endurance limit without exceeding the endurance limit of gauge member 1, thus requiring less cycles of the load to be applied to the test specimens, because the test is being conducted on the upper portion of the S-N curve. The terms "endurance limit" and "S-N curve" are used in the same sense as in the text "Mechanics of Materials" by E. P. Popov, Prentice-Hall, Inc. 1952, pages 16 through 19.

Figure 2A:
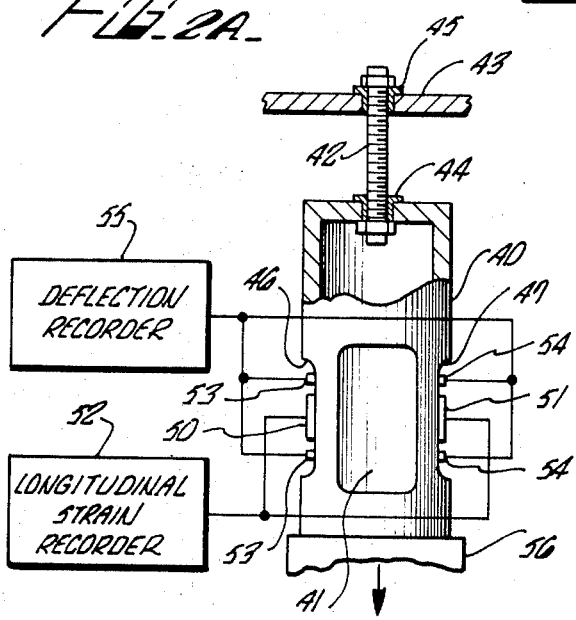
FIG. 2A is a front elevation view partially in section of another embodiment of apparatus incorporating the principles of the invention.
Figure 2B:
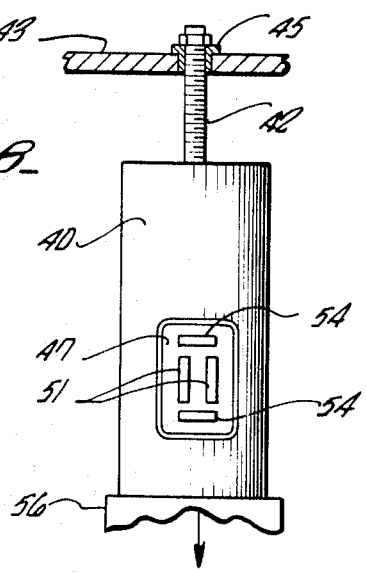
FIG. 2B is a side elevation view of the apparatus of FIG. 2A.

In FIGS. 2A and 2B, another embodiment is shown which employs a hollow, cylindrical gauge member 40 with an opening 41 providing access to its hollow interior. A test specimen 42 extends between the interior of gauge member 40 and a stationary plate 43, which is part of the dynamic fatigue testing machine. Adapter sleeves 44 and 45 prevent lateral motion of specimen 42. Gauge member 40 has flat surfaces 46 and 47 formed on opposite sides of its perimeter. A pair of strain gauges 50 are bonded to surface 46 parallel to the cylindrical axis of guage member 40 and a pair of strain guages 51 are bonded to surface 47 parallel to the cylindrical axis of gauge member 40. The outputs of strain gauges 50 and 51 are combined and applied to a longitudinal strain recorder 52. Similarly, a pair of strain gauges 53 are bonded to surface 46 in orthogonal relationship to strain gauges 50 and a pair of strain gauges 54 are bonded to surface 47 in ortogonal relationship to strain guages 51. The outputs of strain gauges 53 and 54 are also combined and applied to a deflection recorder 55. A disadvantage of this arrangement is that only deflection in one plane is detected and recorded. The machine, a part of which is designated 56 in FIG. 2A or 2B, applies a downward tensile force on gauge member 40 as indicated by the arrows.

Instead of a single recorder, two separate recorders could be used in the embodiment of FIG. 1. Likewise, a single recorder could be used in the embodiment of FIG. 2 instead of two separate recorders.

What we claim is:

1. In dynamic fatigue testing apparatus of the type used to impose cyclical loads on a test specimen along its longitudinal axis, an improvement comprising:
   a gauge member connected in series with the test specimen as the cyclic load is imposed, the gauge member having a greater endurance limit than the test specimen;
   means for monitoring the stress on the gauge member along its longitudinal axis as the cyclic load is imposed; and
   means for monitoring the deflection of the gauge member transverse to its longitudinal axis as the cyclic load is imposed.

2. Testing apparatus comprising:
   first means for holding one end of a test specimen;
   second means for holding the other end of the test specimen, the second means being spaced from and substantially aligned with the first means on an axis;
   means for applying a cyclically varying force between the first and second holding means along the axis to impose a load upon a test specimen;
   first means for monitoring the load imposed upon the test specimen along its longitudinal axis; and
   second means for monitoring the deflection of the test specimen transverse to its longitudinal axis while the load is being imposed on the test specimen.

3. The apparatus of claim 2, in which the first holding means includes a guage member through which the cyclic force is applied, and the first and second monitoring means comprise strain gauges bonded to the surface of the gauge member and means for indicating the response of the strain gauges.

4. The apparatus of claim 3, in which the gauge member is a thin, solid, cylindrical piece of material.

5. The apparatus of claim 4, in which the first monitoring means comprises four strain gauges spaced around the perimeter of the gauge member at 90° intervals and oriented parallel to the axis and means for indicating the response of the four strain gauges, and the second monitoring means comprises four strain gauges spaced around the perimeter of the gauge member at 90° intervals between the respective ones of the first monitoring means and oriented transverse to the axis and means for indicating the response of the four strain guages oriented transverse to the axis.

6. The apparatus of claim 5, in which the first and second holding means each comprise:
   a hub having male threads;
   a specimen mount having a cavity with female threads engageable with the threads of the hub and a bore; and
   a sleeve with an outside diameter that fits snugly within the bore and an inside diameter that fits snugly around the specimen.

7. The apparatus of claim 2, in which the first monitoring means comprises longitudinal strain gauges and a recorder connected to the longitudinal strain gauges, and the second monitoring means comprises transverse strain gauges and a recorder connected to the transverse strain gauges.

8. The apparatus of claim 3, in which the gauge member is a hollow cylinder, the cylinder has at least one flat surface, and the first and second monitoring means comprise strain gauges bonded to the flat surface and means for indicating the response of the strain gauges.

9. The apparatus of claim 8, in which the strain gauges of the first monitoring means are oriented parallel to the axis and the strain gauges of the second monitoring means are oriented transverse to the axis.

10. The apparatus of claim 8, in which the gauge member has an opening for access to its hollow interior.

11. The apparatus of claim 10, in which the gauge member has a bore at one end and a sleeve with an outside diameter forming a tight fit with the bore and an inside diameter forming a tight fit with the test specimen.

12. The apparatus of claim 3, in which the indicating means is a recorder that registers on a single storage medium both the longitudinal strain and deflection of the specimen.

13. The apparatus of claim 3, in which the gauge member has a greater endurance limit than the test specimen.

14. A method for fatigue testing a specimen comprising the steps of:
   imposing a cyclic load on the specimen;
   monitoring the stress on the specimen along its longitudinal axis while the load is being imposed on the specimen; and
   monitoring the deflection of the specimen transverse to its longitudinal axis while the load is being imposed on the specimen.

15. In a method of fatigue testing a specimen by applying a cyclically varying force to the specimen along its longitudinal axis, the improvement which comprises the step of monitoring the deflection of the specimen transverse to its longitudinal axis during the application of the cyclically varying force to the specimen.

16. A method of testing a specimen comprising the steps of:
   applying a cyclically varying force to the specimen through a gauge member;
   producing an indication of the stress exerted on the gauge member during application of the force; and
   producing a continuous indication of the deflection of the gauge member transverse to the direction of application of the cyclically varying force during application of the force.

17. In a method of fatigue testing a test specimen by applying a cyclically varying load to the specimen along its longitudinal axis the improvement which comprises the step of applying the load to the specimen through a gauge member having a greater endurance limit than the specimen and sensing the transverse strain on the gauge member.